United States Patent
Levitt

(10) Patent No.: US 10,200,134 B2
(45) Date of Patent: Feb. 5, 2019

(54) COMMUNICATIONS SYSTEMS, METHODS AND DEVICES HAVING IMPROVED NOISE IMMUNITY

(71) Applicant: Audimax LLC, New York, NY (US)

(72) Inventor: Harry Levitt, Bodega Bat, CA (US)

(73) Assignee: AUDIMAX, LLC, New York, NY (US)

( * ) Notice: Subject to any disclaimer, the term of this patent is extended or adjusted under 35 U.S.C. 154(b) by 213 days.

(21) Appl. No.: 14/617,527

(22) Filed: Feb. 9, 2015

(65) Prior Publication Data

US 2016/0359571 A1    Dec. 8, 2016

Related U.S. Application Data

(60) Provisional application No. 61/938,072, filed on Feb. 10, 2014, provisional application No. 61/981,010, filed on Apr. 17, 2014.

(51) Int. Cl.
| | | |
|---|---|---|
| *H04B 1/00* | (2006.01) | |
| *H04B 15/00* | (2006.01) | |
| *H04B 17/345* | (2015.01) | |

(52) U.S. Cl.
CPC .......... *H04B 15/00* (2013.01); *H04B 17/345* (2015.01)

(58) Field of Classification Search
CPC ............ H04B 3/542; H04B 2203/5408; H04L 1/0606; H04L 1/0618; H04L 27/2627; H04L 2001/0093

See application file for complete search history.

(56) References Cited

U.S. PATENT DOCUMENTS

| | | | |
|---|---|---|---|
| 6,363,257 B1* | 3/2002 | Warwick | H04L 1/0072 455/101 |
| 6,424,939 B1 | 7/2002 | Herre et al. | |
| 7,043,312 B1 | 5/2006 | Moorer | |
| 2001/0031053 A1 | 10/2001 | Feng | |
| 2004/0133423 A1* | 7/2004 | Crockett | G10L 19/02 704/229 |

(Continued)

FOREIGN PATENT DOCUMENTS

| | | | | |
|---|---|---|---|---|
| EP | 0540329 A2 | 5/1993 | | |
| JP | 5157863 B2 * | 3/2013 | ........... | G10L 19/018 |

(Continued)

OTHER PUBLICATIONS

International Search Report dated May 14, 2015 for PCT application No. PCT/US15/15013.

(Continued)

*Primary Examiner* — Edward Urban
*Assistant Examiner* — Max Mathew
(74) *Attorney, Agent, or Firm* — Hunton Andrews Kurth LLP

(57) ABSTRACT

Communications systems, methods and devices having improved noise immunity are disclosed. In one embodiment, a method for improving noise immunity in a communication may include (1) at least one computer processor determining a region of interest in a received signal; (2) the at least one computer processor determining a surrogate candidate within the region of interest of the signal; and (3) the at least one computer processor encoding the surrogate candidate as a surrogate in a region of the signal other than the region of interest.

39 Claims, 11 Drawing Sheets

(56) References Cited

U.S. PATENT DOCUMENTS

| | | | |
|---|---|---|---|
| 2007/0189425 A1 | 8/2007 | Becker | |
| 2008/0130793 A1* | 6/2008 | Rajendran | G10L 19/0204 375/317 |
| 2011/0235826 A1* | 9/2011 | Pakzad | H04R 3/04 381/119 |
| 2011/0280181 A1* | 11/2011 | Guey | H04L 27/2607 370/328 |
| 2012/0106366 A1* | 5/2012 | Gauvin | H04L 43/0835 370/252 |
| 2015/0358040 A1* | 12/2015 | van Houtum | H04B 1/10 342/367 |

FOREIGN PATENT DOCUMENTS

| | | | | |
|---|---|---|---|---|
| WO | 2013/079138 A1 | 6/2013 | | |
| WO | WO 2013079138 A1 * | 6/2013 | | H04L 1/0606 |

OTHER PUBLICATIONS

Written Opinion dated May 14, 2015 for PCT application No. PCT/US15/15013.

International Search Report and the Written Opinion of the International Searching Authority dated May 14, 2015 for PCT application No. PCT/US15/15013.

International Search Report dated Jul. 24, 2015 for PCT application No. PCT/US2015/026319.

Written Opinion dated Jul. 24, 2015 for PCT application No. PCT/US2015/026319.

International Search report and the Written Opinion of the International Searching Authority dated Jul. 24, 2015 for PCT application No. PCT/US2015/026319.

European Search Report for Application No. EP 15 74 5876.1 dated Oct. 9, 2017 and distributed by the European Patent Office, 80298 Munich, Germany.

\* cited by examiner

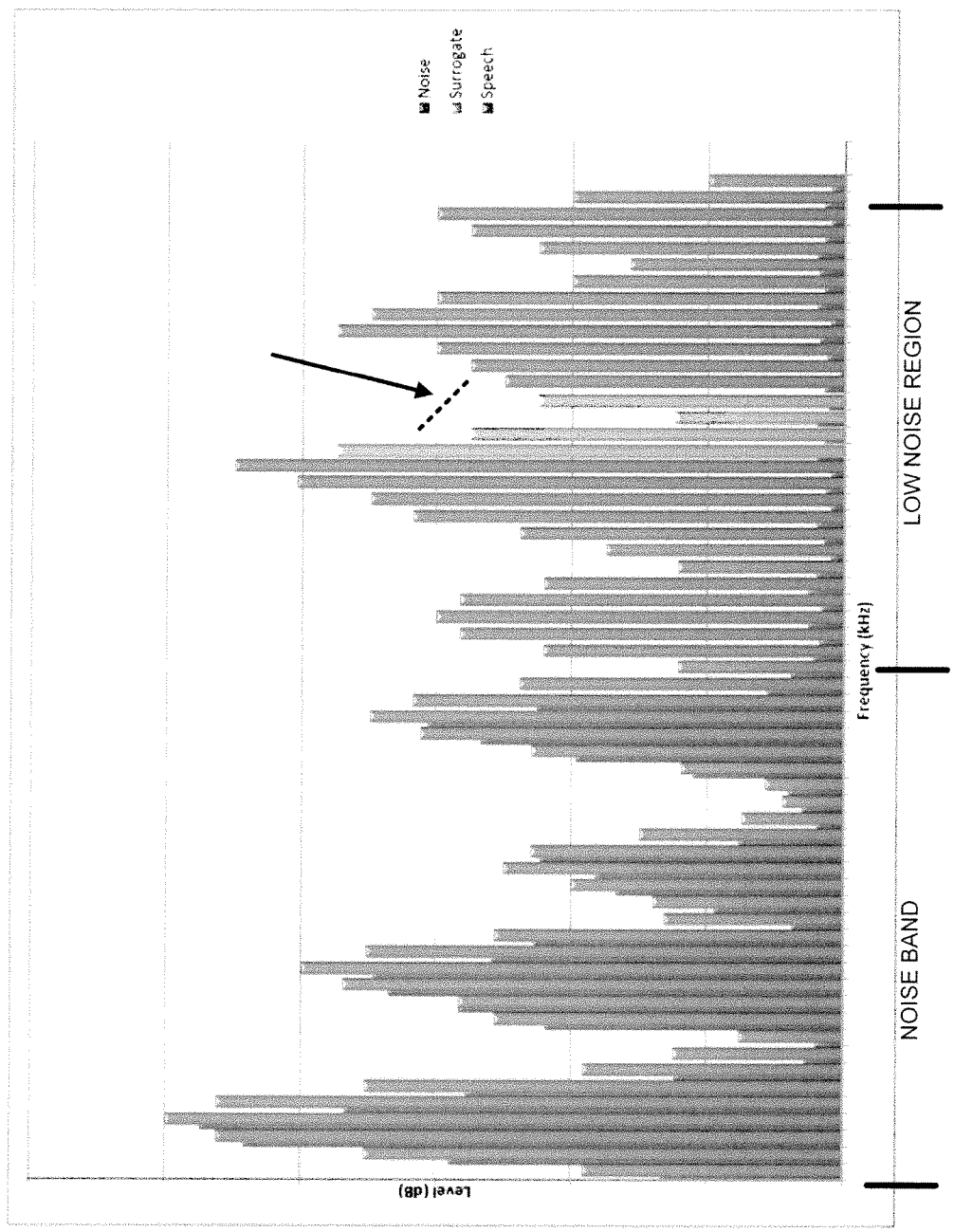

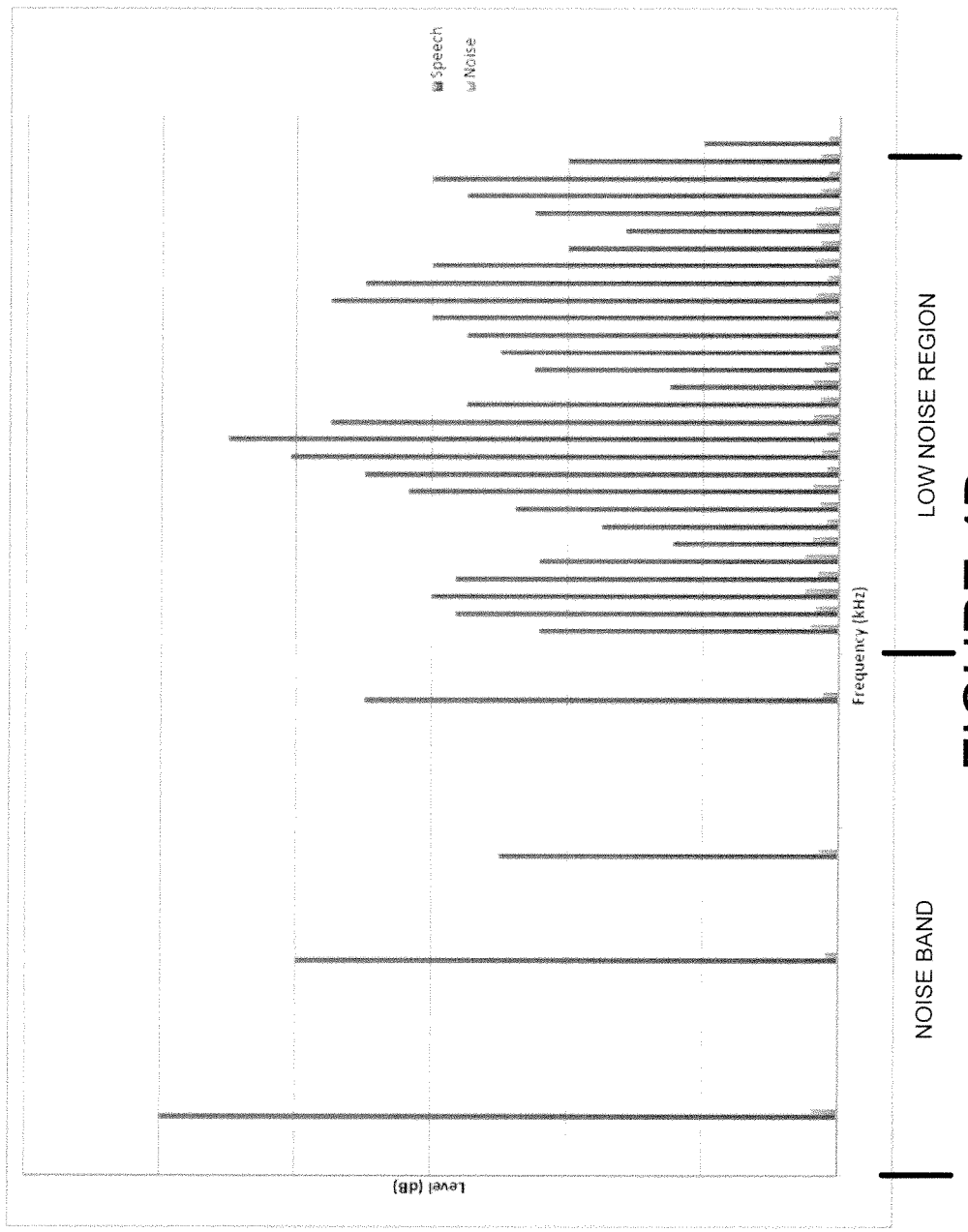

COMMUNICATIONS SYSTEMS, METHODS AND DEVICES HAVING IMPROVED NOISE IMMUNITY

RELATED APPLICATIONS

This application claims priority to U.S. Provisional Patent Application Ser. No. 61/938,072, filed Feb. 10, 2014, and U.S. Provisional Patent Application Ser. No. 61/981,010, filed Apr. 17, 2014, the disclosures of which are hereby incorporated by reference in their entireties.

BACKGROUND OF THE INVENTION

1. Field of the Invention

The present invention generally relates to electronic communications, and, more particularly, to communications systems, methods and devices having improved noise immunity.

2. Description of the Related Art

In today's world, we rely extensively on modern communication systems, such as cellular phones, radios, etc. The popularity of these devices, and their importance in our everyday lives, will only increase.

SUMMARY OF THE INVENTION

Communications systems, methods and devices having improved noise immunity to noise and/or distortion are disclosed. In one embodiment, the systems, methods and devices may identify one or more elements of a signal (or signals) that are potentially masked by noise, and encode the signal(s) (e.g., move the elements(s) to different frequencies, domains, etc.) so that the signal(s) are more likely to survive transmission. A receiving, device, if enabled, may decode the encoded signals and perform additional processing to enhance the intelligibility and/or quality (e.g., amplify key elements, attenuate or not reproduce the noise, etc.) of the decoded signals. Devices that can decode the signal may be referred to as "enabled devices." A receiving device that is not enabled will receive the signals without perception of the encoding for improved noise immunity.

It is an objective to provide systems, methods and devices in which an audio signal may be processed either prior to or during transmission to one or more receivers. Additional apparatus may be used post-transmission (e.g., at repeater stations) to process the signals. The signal processing may provide improved immunity of the audio-video signal (e.g., speech, music, etc.) to transmission of undesirable noise and/or distortions that may be present at the source or acquired during transmission. As used herein, immunity refers to a process by which the signal is less susceptible to the effects of noise and/or distortion.

It is a further objective to provide systems, methods and devices in which the processed audio-video signal, including additional information, may be perceptually indistinguishable from the unprocessed audio-video signal, thereby improving audio-video intelligibility and/or sound quality without perceptually affecting the signal quality for users of receiving devices that do not decode the processed signal.

Methods for improving noise immunity in a communication are disclosed. In one embodiment, a method may include (1) at least one computer processor determining a region of interest in a received signal; (2) the at least one computer processor determining a surrogate candidate within the region of interest of the signal; and (3) the at least one computer processor encoding the surrogate candidate as a surrogate in a region of the signal other than the region of interest.

In one embodiment, the signal may comprise an audio signal. In another embodiment, the signal may comprise a video signal. In still another embodiment, the signal may comprise both.

In one embodiment, the region of interest may comprise a noise band within the signal.

In one embodiment, the surrogate candidate may comprise an element of the signal that has an intensity below an intensity within the region of interest.

In one embodiment, the method may further include generating a spectrum representation of the signal using a transform selected from the group consisting of a Fourier transform, a Fast Fourier transform, a Discrete Fourier transform, a Gabor transform, and a Gabor-Wigner transform.

In one embodiment, the step of encoding the surrogate candidate as a surrogate in a region of the signal other than the region of interest may include the at least one computer processor encoding the surrogate candidate in a phase element of the signal.

In one embodiment, the step of encoding the surrogate candidate as a surrogate in a region of the signal other than the region of interest may include the at least one computer processor encoding the surrogate candidate within a spread-of-masking range of an intense frequency element.

In one embodiment, the step of encoding the surrogate candidate as a surrogate in a region of the signal other than the region of interest may include the at least one computer processor encoding the surrogate candidate within a predetermined range of an intense frequency element.

In one embodiment, the method may further include the at least one computer processor transmitting the signal comprising the surrogate to a second device.

In one embodiment, the method may further include the at least one computer processor generating a regenerated signal from the signal comprising the surrogate; and transmitting the regenerated signal to a second device.

According to another embodiment, a method for improving noise immunity in a communication may include (1) at least one computer processor identifying a surrogate candidate encoded as a surrogate in a signal; (2) the at least one computer processor restoring the surrogate candidate in the signal; and (3) the at least one computer processor generating a regenerated signal from the signal with the restored surrogate candidate.

In one embodiment, the method may further include generating a spectrum representation of the signal comprising the surrogate using a transform selected from the group consisting of a Fourier transform, a Fast Fourier transform, a Discrete Fourier transform, a Gabor transform, and a Gabor-Wigner transform, and the surrogate may be identified in the spectrum representation.

In one embodiment, the surrogate may be in a phase element of the signal. In another embodiment, the surrogate may be within a spread-of-masking range of an intense frequency element. In still another embodiment, the surrogate may be within a predetermined range of an intense frequency element.

In one embodiment, the method may further include the at least one computer processor amplifying the surrogate.

In one embodiment, the method may further include the at least one computer processor determining a region of interest in a received signal; and the at least one computer processor attenuating the intensity of at least one signal element within the region of interest.

Communication devices are disclosed. In one embodiment, a communication device may comprise a memory; at least one computer processor that performs the following: determine a region of interest in a signal; determine a surrogate candidate within the region of interest of the signal; and encode the surrogate candidate as a surrogate in a region of the signal other than the region of interest; and an interface for communicating with a second communication device.

In one embodiment, the communication device may include an input device, such as a microphone and a camera, for receiving the signal. In another embodiment, the signal may be received from the memory. In another embodiment, the signal may be received from a communication network.

In one embodiment, the communication device may include an output device, such as a speaker and/or a display, for outputting the regenerated signal.

In one embodiment, the at least one computer processor may further identify a surrogate candidate encoded as a surrogate in a received signal; restore the surrogate candidate in the signal; generate a regenerated signal from the signal with the restored surrogate candidate; and output the regenerated signal.

In one embodiment, the at least one computer processor may further generate a spectrum representation of the signal using a transform selected from the group consisting of a Fourier transform, a Fast Fourier transform, a Discrete Fourier transform, a Gabor transform, and a Gabor-Wigner transform; and transmit the spectrum representation to the second communication device. The surrogate candidate may be encoded in the spectrum representation of the signal.

In one embodiment, the at least one computer processor may further generate a regenerated signal from the signal comprising the surrogate; and transmit the regenerated signal to the second communication device.

In one embodiment, the at least one computer processor may further amplify the surrogate.

In one embodiment, the signal may comprise an audio signal. In another embodiment, the signal may comprise a video signal. In still another embodiment, the signal may comprise both.

In one embodiment, the region of interest may comprise a noise band within the signal.

In one embodiment, the surrogate candidate may comprise an element of the signal that has an intensity below an intensity within the region of interest.

In one embodiment, the surrogate candidate may be encoded in a phase element of the signal. In another embodiment, surrogate candidate may be encoded within a spread-of-masking range of an intense frequency element. In still another embodiment, the surrogate candidate may be encoded within a predetermined range of an intense frequency element.

According to another embodiment, a communication device, may include a memory and at least one computer processor that performs the following: identify a surrogate in a received signal; and generate a regenerated signal from the received signal based on the identified surrogate and generate a regenerated signal from the signal with the surrogate candidate.

In one embodiment, the at least one computer processor may further restore the identifies surrogate in the signal.

In one embodiment, the communication device may include an output device, such as a speaker and/or a display, for outputting the regenerated signal.

In one embodiment, the received signal may be received from a second communication device. In another embodiment, the signal may be received from the memory. In another embodiment, the signal may be received from a communication network.

BRIEF DESCRIPTION OF THE DRAWINGS

For a more complete understanding of the present invention, the objects and advantages thereof, reference is now made to the following descriptions taken in connection with the accompanying drawings in which:

FIGS. 4A-4D depict spectrum examples of an exemplary method of encoding surrogates according to one embodiment;

DETAILED DESCRIPTION OF EMBODIMENTS

Figure 1:
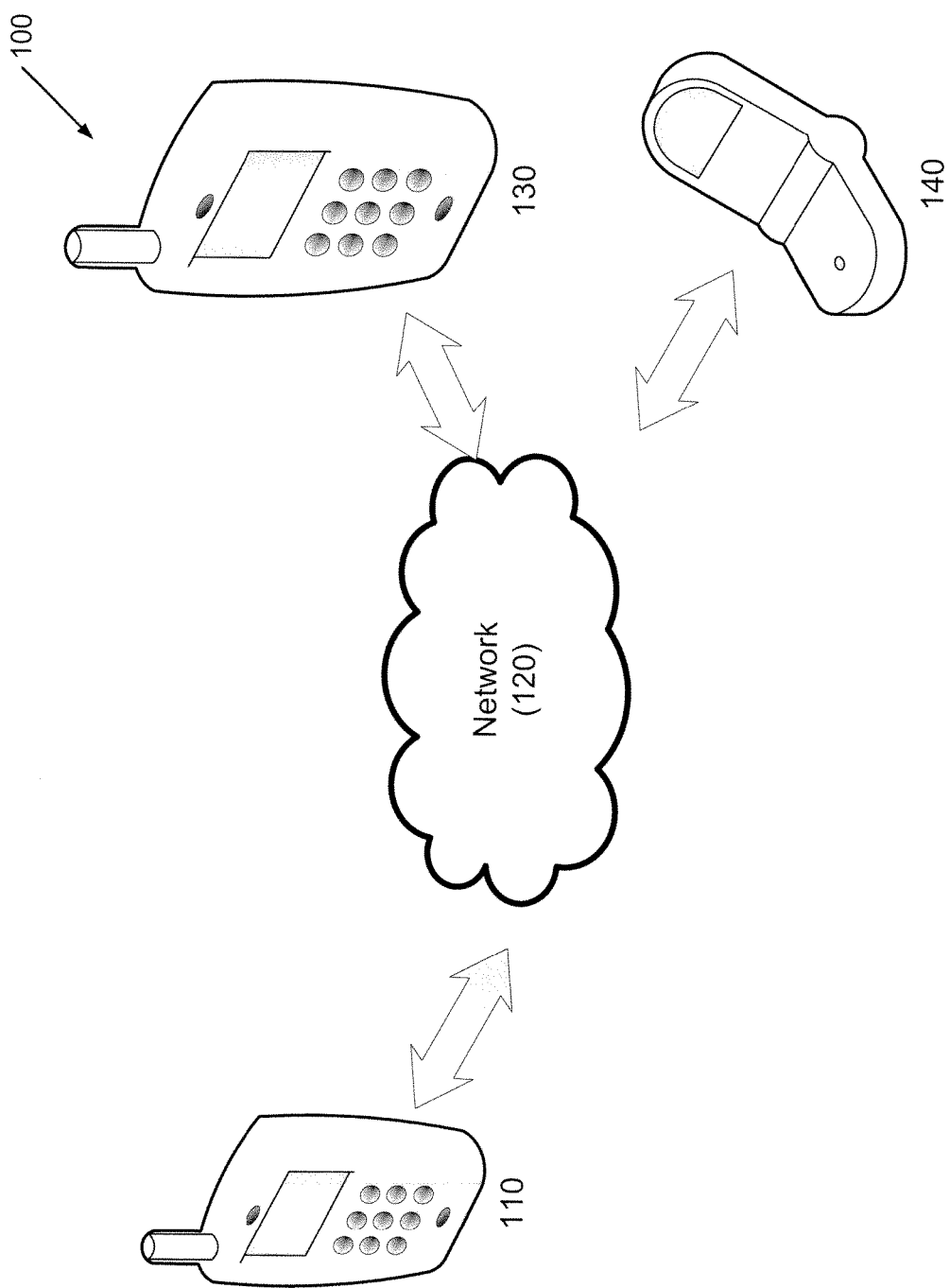
FIG. 1 depicts an exemplary system for improved noise immunity according to one embodiment.

Several embodiments of the present invention and their advantages may be understood by referring to FIGS. 1-7, wherein like reference numerals refer to like elements. The embodiments disclosed herein may be in the context of the complex case of audio signal transmission because of the inherent problem of an analysis over a finite time interval using a transform that involves integration over infinite time, as discussed in below. This problem does not occur with video images since the basic unit of video signal transmission, the "frame," is a finite entity consisting of a finite number of signal elements (pixels).

In general, the Fourier transform, or any other transform of this type, converts a time function to a frequency spectrum. These transformations involve averages over infinite time, from time $t=-\infty$ to $t=+\infty$. It is also assumed that the time function is stationary (e.g., its spectrum does not vary with time). Since the audio signals discussed herein may vary with time, short-term frequency transforms may be used in which a region of interest in the time signal is multiplied by a weighting function of finite duration; e.g., a rectangular waveform of finite duration. This mathematical manipulation may allow for the assumption that the time function is periodic with a period equal to the duration of the time-limited weighting function.

The Fourier transform of this assumed periodic function determines the "short-term spectrum" of a time-varying signal over a region of interest. It should be noted that, with the exception of periodic signals, every application of the Fourier transform in the analysis of real-world signals results in a short-term spectrum. The term "short-term spectrum", however, is not commonly used when the duration of the weighting function is relatively long; e.g., more than the averaging time of the human ear when analyzing audio signals. The abbreviated term "spectrum" is used instead. The terminology used herein follows this conventional usage.

The term "short-term spectrum," or the more general term, "time-frequency element," may be used when weighting functions of short duration are required in order to take into account important short-term temporal characteristics of time-varying signals.

FIG. 1 depicts a system for improved noise immunity according to one embodiment. System 100 may include, for example, transmitting device 110, communication network 120, and receiving devices 130 and 140.

In one embodiment, transmitting device 110 and receiving devices 130/140 may be any suitable device that may transmit and/or receive audio, audio/video, and/or data signals, including analog and digital signals. Examples include mobile phones/devices, landline telephones, hearing aids, personal amplification devices, assistive listening devices, video and audio conferencing systems, voice over IP devices, streaming radio devices, two-way radios, tablet computers, desktop and notebook computers, workstations, electronic reading devices, etc. For purposes of this disclosure, although transmitting device 110 and receiving devices 130/140 may both transmit and receive audio or audio/video signals, each will be referred based on its role in a part of a conversation or transmission. For example, device 110 may function as a transmitter and device 130 as a receiver when a conversation is initiated and then switch roles later in the conversation, with device 130 functioning as a transmitter and device 110 functioning as a receiver.

Communication network 120 may permit communication between transmitting device 110 and one or more receiving device 130/140. Examples include plain old telephone systems (POTS), cellular networks, WiFi networks, the Internet, satellite networks, near field communications networks, Bluetooth networks, and any combinations thereof. Any suitable communications network may be used as necessary and/or desired.

In one embodiment, transmitting device 110 may be enabled to perform signal processing prior to transmission of the signal to one or more receiving device 130/140.

In one embodiment, receiving device 130 may be enabled to process/decode received signals to improve noise/distortion immunity, while receiving device 140 may include no such processing capability.

Although processing may be described in this disclosure as occurring at the transmitting and receiving devices, it should be recognized that processing may involve additional hardware (not shown) that may be separate from these devices. In addition, additional or alternative hardware in the communication network (e.g., a special purpose repeater, amplifiers, computer servers, central office systems, cell towers, etc.) may further process the communications signals as necessary and/or desired. For example, a repeater may process an incoming signal to improve its immunity to noise/distortion. Similarly, a transmitter along the communication path may generate and transmit for example, a sparse spectrum representation of the signal, and may communicate that sparse spectrum representation to a subsequent receiver, which may perform the inverse operation. As used herein, a "sparse spectrum representation" is one in which spectral components of the signal have been eliminated. A typical sparse spectrum representation may include, for example, only important information-bearing spectral components of the signal. One property of a sparse spectrum representation is that fewer bits or channel capacity are needed to store or transmit, respectively, a sparse spectrum representation of a signal.

Figure 2:
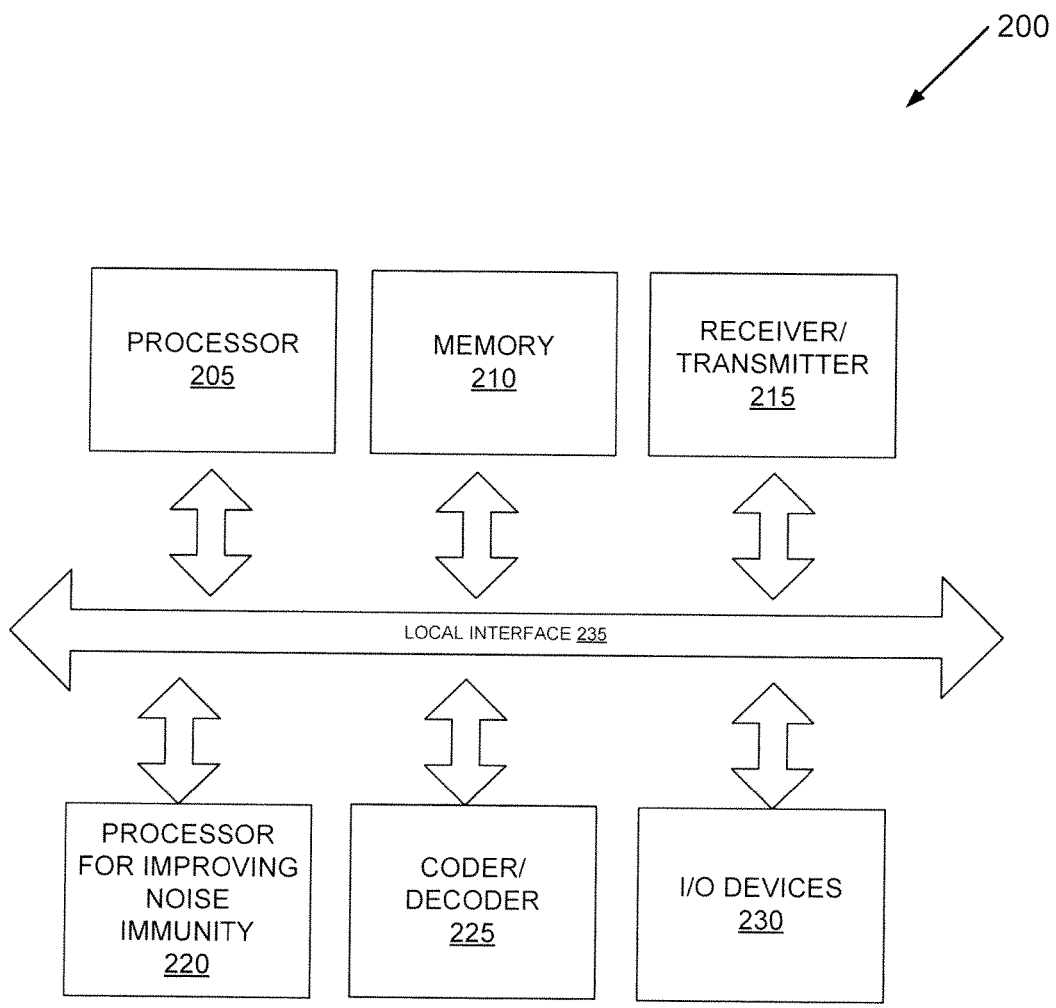
FIG. 2 depicts an exemplary block diagram for an enabled transmitting or receiving device.

FIG. 2 depicts a block diagram for an enabled transmitting or receiving device. According to one embodiment, transmitting or receiving device 200 may be implemented in software, firmware, hardware or a combination thereof. In one embodiment, a portion of the present system is implemented in software, as an executable program, and is executed by a special digital signal processor or microcomputer, a general purpose digital computer, such as a personal computer, personal data assistant, smart phone, workstation, minicomputer or mainframe computer. For example, in one embodiment transmitting or receiving device 200 may include processor 205, memory 210, receiver/transmitter 215, one or more input/output (I/O) devices 230, coder/decoder (for enabling the device) 225, and a processor for improving noise/distortion immunity 220 that are communicatively coupled via interface 235. The local interface 235 can be, for example but not limited to, one or more buses or other wired or wireless connections, as is known in the art.

In one embodiment, a receiving device does not need to include one or more of a processor for improving noise/distortion immunity 220 and a coder/decoder 225.

In one embodiment, the "surrogates" disclosed herein may be encoded such that the user of a receiving device that is not enabled to decode surrogates would not perceive a change in intelligibility and/or quality if the surrogates are not decoded or otherwise processed. As used herein, "surrogate" refers to a time-frequency signal element that is recoded to be present in another part of the signal (e.g., in a different frequency, time, or phase region).

Figure 3:
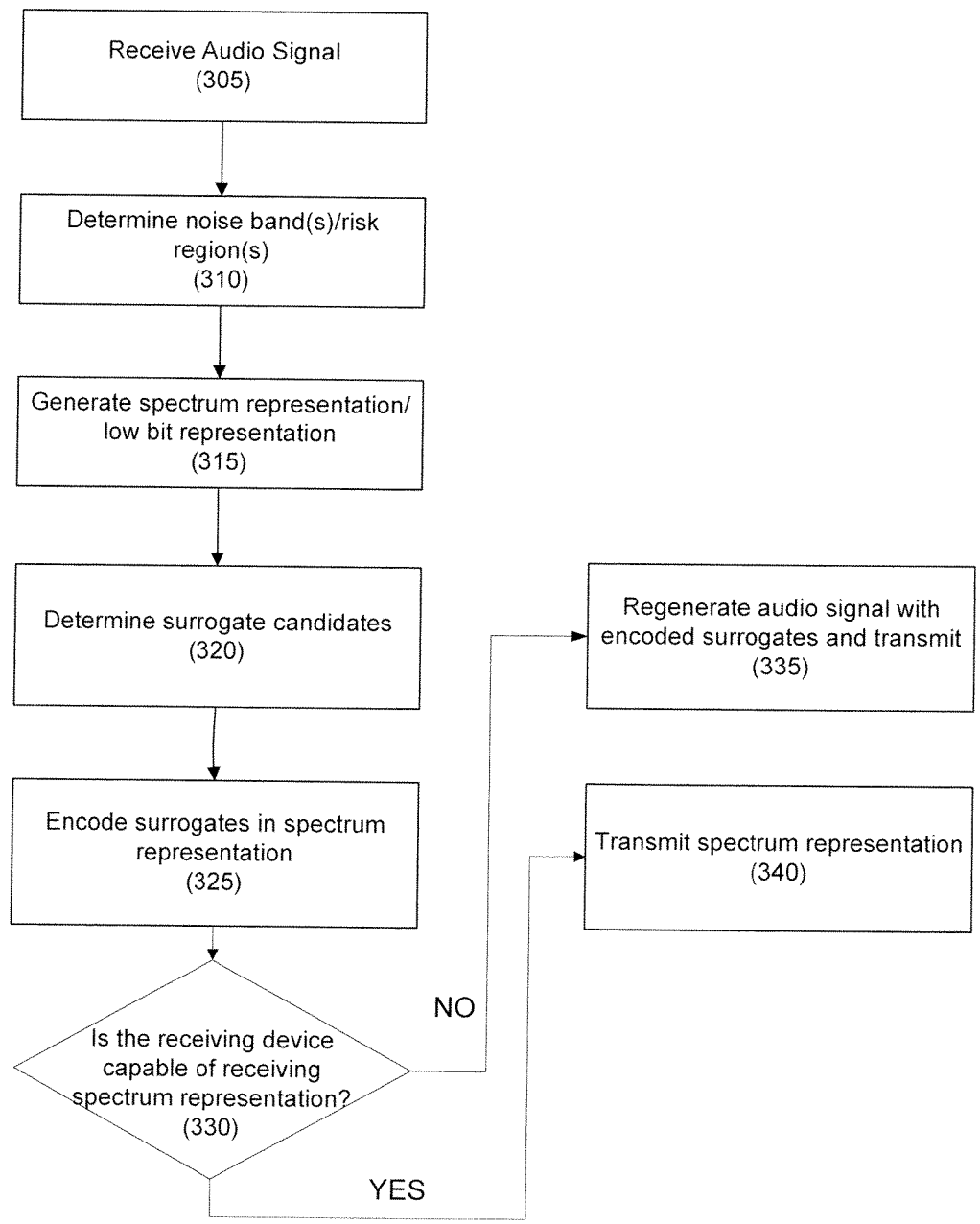
FIG. 3 depicts an exemplary method for improving noise/distortion immunity according to one embodiment.

FIG. 3 depicts a method for improving noise/distortion immunity according to one embodiment. In step 305, an audio signal is prepared for transmission. Conventional signal processing is used to prepare the signal for digital processing. This may include amplification and pre-whitening to make efficient use of the dynamic range of the digital processor. A sampling rate greater than twice the highest frequency in the audio signal is used in order to avoid aliasing errors. In one embodiment, the audio signal may be received at a transmitting and receiving device, for example, a cellular phone, tablet computer, smart phone, two-way radio, etc. In one embodiment, the audio signal may be received directly (e.g., spoken by a human) or indirectly (e.g., received via a hardwired or wireless magnetic or electromagnetic connection), etc.

In one embodiment, the audio signal may include undesired noise/distortion. For example, background noise (e.g., 60 Hz "hum" from an electrical device, ambient room noise, such as an air conditioner, crowd noise, traffic, background voices, reverberation, etc.) may be present.

In one embodiment, the transmitting device may perform optional signal pre-processing. For example, the audio signal may be sampled in preparation for digital processing. Additional pre-processing techniques that are well known in the art for improving various audio signal performance metrics such as, signal-to-noise ratio, signal strength, spectral shape, loudness, physical and perceptual quality of audio signals, may be applied during signal pre-processing. These conventional pre-processing techniques may include, but are not limited to, signal pre-whitening, frequency filtering, compression amplification, noise attenuation, and the like. One or any combination of the aforementioned conventional pre-processing techniques, or other techniques, may be employed as necessary and/or desired.

In step 310, one or more risk regions or noise bands associated with the signal may be determined. The term "noise band" may include distortion of the signal as well as the addition of noise within a frequency band or other region (phase, time, amplitude) of the signal. In one embodiment, a noise band may be spectral or temporal regions in the transmission channel in which noise or other distortions will interfere with speech intelligibility and/or sound quality. A risk region may have the same spectral and temporal structure as a noise band, but with an important difference in that interference in a noise band is certain, whereas interference in a risk region is not certain but may occur with a high probability or likelihood. The interference in a noise band or risk region may be random (such as thermal noise generated in electronic components), or deterministic with a predictable or partially predictable waveform such as a periodic interference (e.g., hum from an electrical device), predictable transient interference (such as clicks produced by switching circuits), or background voices resulting from crosstalk with other communication channels. In addition, noise band(s)/risk region(s) may include frequency, phase, amplitude or temporal distortions, and combinations thereof.

The noise band(s) or risk region(s) may be identified for a person with "normal" hearing as well as a person with a hearing loss. Notably, more than one noise band/risk region and/or more than form of distortion may be present.

In one embodiment, the noise band(s) or risk region(s) may be predetermined, such as all frequencies below 1000 Hz (e.g., a common frequency region for significant ambient noise). In another embodiment, the noise band(s) or risk region(s) may be dynamically determined, such as identifying background noise during pauses in the speech signal. In another embodiment, any frequency elements of the audio signal that are desired to be preserved may be encoded. In still another embodiment, the noise band(s) or risk regions(s) may be determined based on feedback from the transmitter/receiver at the other end of the communication link. Other ways of identifying noise band(s) or risk regions(s) may be used as necessary and/or desired.

In step 315, a sparse spectrum representation (or other low-bit representations) of the signal may be generated. In one embodiment, the sparse spectrum representation of a signal may not differ perceptually from the full spectrum representation although the sparse spectrum representation is specified with fewer bits; i.e., less channel capacity is needed to transmit, or store, a sparse spectrum representation of a signal. The use of sparse spectrum representations of surrogates may substantially increase the efficiency of encoding surrogates.

Suitable transforms that may be used to generate sparse spectrum representations may include, for example, Fourier transforms, Fast Fourier transforms, Discrete Fourier transforms, Gabor transforms, Gabor-Wigner transforms, and the like. Any other suitable transform or mathematical operation may be used as is necessary and/or desired.

In one embodiment, each of the frequency elements in a sparse spectrum representation may have intensity, frequency, and phase values.

In one embodiment, the frequency elements of the sparse spectrum representation may be analyzed in order to determine the intensity values of the frequency elements. Subsequently, frequency elements may be ranked in a descending order of intensity values. The frequency elements selected for subsequent processing may be a subset of the most intense frequency elements. The number of elements may be based on a predetermined or dynamic number depending on the content of the speech signal or the number and width of the noise bands and risk regions of the transmission path. In one embodiment, the high intensity frequency elements may be dynamically selected at any applicable stage throughout signal processing. In one embodiment, the selected frequency elements may have intensities that convey the most intelligible elements of the audio signal. Similarly, intensity values of the frequency elements may be ordered in a manner that is either predetermined or dynamic. In the embodiment, intensity values of the frequency elements may be analyzed and modified to improve the intelligibility and/or sound quality of the speech signal.

Other parameters for ordering frequency elements, such as phase, amplitude, power, etc. may be used as necessary and/or desired. Other types of elements, such as wavelets, logons, frequency elements modulated by time functions of finite duration, temporal elements located in different frequency regions, or other such elements having a time-frequency structure may be used. The criteria for ordering the time-frequency elements and deciding which time-frequency elements to discard or modify may vary depending on the desired method of coding or decoding the signals. In one embodiment, low-intensity time-frequency elements that are not audible may be replaced by inaudible time-frequency elements containing information that can be used in coding to improve noise immunity, speech intelligibility and/or sound quality, or other desired properties of the audio signal including music. Low-intensity time-frequency elements may be inaudible as a result of being masked by more intense time-frequency elements occurring simultaneously, or in close proximity in time and/or frequency, with the masked time-frequency element. In another embodiment, high-intensity time-frequency elements rather than low-intensity time-frequency elements may be modified or eliminated. In one embodiment for people with a reduced dynamic range of hearing (seniors, people with hearing loss) the most intense time-frequency elements may be reduced in intensity in order to match the dynamic range of the transmitted or received signals to the listener's dynamic range of hearing.

In step 320, "surrogate candidates" may be determined. A surrogate candidate is a signal element (frequency element, time-frequency element, or time element) that is likely to be lost in transmission. In one embodiment, surrogate candidates may be signal elements that may be within the noise band(s) or risk region(s). In another embodiment, surrogate candidates may be low-intensity signals that are likely to be lost (inaudible or unintelligible) in the noise band(s) or risk region(s). These surrogate candidates may be transformed in frequency and/or time into surrogates in one or more risk-free or noise-free regions. The transformed signal element in a risk-free or noise-free region is the surrogate of the signal element at risk (the surrogate candidate).

If the noise band(s)/risk region(s) are unknown, cannot be determined reliably, or encompass the entire frequency spectrum of the transmitted signal, double encoding may be used in which all of the frequency elements in the transmitted signal are encoded as surrogates. An example of such an implementation is to divide the frequency spectrum into two parts, e.g., Part A and Part B. The frequency elements in Part A are encoded as surrogates in Part B, and the frequency elements in Part B are encoded as surrogates in Part A. Any portion of the frequency spectrum that is lost in transmission will have a surrogate in another portion of the frequency spectrum, provided that the loss of frequency elements in transmission does not exceed 50-percent of the spectrum. If more than 50-percent of the spectrum is likely to be lost in transmission, triple encoding may be used in which a surrogate of each frequency element is encoded in two other locations in the signal spectrum. Multiple encoding of surrogates may be used subject to the efficiency with which sparse spectrum techniques, or other low-bit representations can be used in encoding surrogates.

In one embodiment, a sparse spectrum representation of speech using only, for example, the 16 most intense frequency elements may be encoded as surrogates to provide immunity against noise and/or distortion. A sparse spectrum representation of this type sounds almost the same as the unprocessed speech signal. If more than the example 16 frequency elements are used, the sparse spectrum representation may be perceptually indistinguishable from the full spectrum representation. Examples of such advanced signal processing are disclosed in H. Levitt, M. Bakke, J. Kates, A. Neuman & M. Weiss, "Advanced signal processing hearing aids," Proceedings of the Danavox Jubilee Symposium, 333-358. Copenhagen: Stougaard Jensen 1993 and T. F. Quartieri and R. J. McAulay, "Speech transformations based on a sinusoidal model," IEEE Transactions on Acoustics, Speech and Signal Processing, 34, 1449-1464, 1986. The disclosures of these documents are incorporated, by reference, in their entireties.

In step 325, the surrogate candidates may be transformed in frequency and/or time into one or more risk-free or noise-free regions, i.e., signals likely to be lost in the noise band or risk region may be encoded as surrogate signal elements. In one embodiment, the surrogates may be encoded in the phase element of the signal. In another embodiment, the surrogates may be encoded within the spread-of-masking range of an intense frequency element. For example, the surrogate may be inserted within a predetermined range of an intense frequency element in the transmitted signal. Since upward spread-of-masking is much greater than downward spread-of-masking in the human ear, the surrogate may be placed at frequencies that are above the frequency of an intense frequency element (e.g., 50 Hz above, a percentage above, etc.). The surrogates may be placed within the upward spread-of-making range of the intense frequency element in the transmitted signal. The method of ordering frequency elements in terms of relative intensity in order to obtain a sparse spectrum representation may be used to identify the frequency elements that are sufficiently intense to mask the surrogates. Whereas the surrogates may be masked or partially masked to the human ear, they are not masked to an electronic decoder. This method of encoding surrogates into noise-free and risk-free frequency regions may improve the likelihood that the surrogates survive transmission through a noisy or distorting transmission path.

In another embodiment, other forms of steganography (concealing a message within a larger one) may be used to encode data regarding the surrogate (e.g., original frequency, intensity, phase, etc. of the surrogate.) These data may be used to reproduce or adjust the surrogate during decoding. Encoding a sparse spectrum representation of a surrogate in a full spectrum representation is an efficient form of steganography in that the sparse spectrum requires fewer bits for its specification, and several sparse spectra of speech, music or other important sounds can be hidden in a full spectrum representation without detection by the human ear.

In another embodiment, a sparse spectrum representation of information-bearing signal elements in several successive time windows (such as the major spectral peaks in each window) may be used to combat the effects of noise bursts or drop outs in which whole sequences of time windows are eliminated. The sparse spectrum representations of the lost time windows in an intact window can be used to regenerate the signals in the lost windows.

In an embodiment using a different form of steganography, audio or audio-video signals may be digitized using conventional binary codes, and the surrogates of important information bearing signal elements in the noise band(s)/risk region(s) may be encoded in the least significant bits of the digital signal in the noise-free bands.

In another embodiment, the surrogates may be encoded in a frequency region outside the normal range of hearing. In one embodiment the frequencies of the surrogates are increased by a fixed offset to the inaudible range of hearing (e.g., +20 KHz).

In another embodiment, for example, involving the transmission of narrowband signals (e.g., the 3.3 kHz bandwidth of older telephones), frequencies of a wideband signal that are outside the bandwidth of a transmitted narrowband signal may be encoded in the narrowband signal that is transmitted. At the receiving end, an enabled receiver may decode the wideband frequency elements and reproduce them at their original frequencies thereby recreating a wideband signal at the receiving end. In one embodiment, the encoding of the wideband signal elements may be such that a listener using a device that is not enabled to decode surrogates will not perceive a change in the intelligibility and/or sound quality of the signal.

This method of transmitting a wideband signal over a narrowband transmission channel differs from traditional methods of bandwidth reduction in that a form of stenography may be used in which information-bearing frequency elements within the bandwidth of the narrowband transmission channel are untouched and not subject to any form of signal processing for bandwidth reduction. In one embodiment, only the weak, inaudible frequency elements are replaced with inaudible surrogates of wideband frequency elements. Other frequency elements may be replaced as necessary and/or desired. Another difference from traditional methods of bandwidth reduction is that a person using a device that is not enabled to decode surrogates may also use the disclosed system without perceiving a change in the intelligibility and/or sound quality of the low bandwidth signal.

In another embodiment, for example, involving the transmission of monophonic signals, a second version of the signal referred to as the "stereo conjugate," may be encoded as surrogates in the transmitted monophonic signal. The stereo conjugate of the monophonic signal differs in amplitude and phase in a manner equivalent to the inter-channel amplitude and phase differences of a stereophonic signal. At the receiving end, an enabled receiver may decode the stereo surrogate and reproduce it synchronously with the monophonic signal so as to create a stereo signal. In one embodiment, the encoding of the stereo surrogate may be such that a listener using a device that is not enabled to decode surrogates will not perceive a change in the intelligibility and/or sound quality of the monophonic signal.

In another embodiment, temporal masking may be used to encode surrogates. For example, information-bearing time-frequency elements (i.e., signal elements of short duration specified in both time and frequency) may be ranked in a descending order of intensity values. The surrogates may be encoded in the time-frequency region immediately after an intense time-frequency element in the transmitted signal. The surrogate will be inaudible as a result of temporal masking in which a high-intensity signal element masks a low-intensity signal element that follows it. While the surrogates may be masked to the human ear, they are not masked to an electronic decoder. This method of encoding surrogates into noise-free and risk-free time-frequency regions may improve the likelihood that the surrogates survive transmission through a noisy or distorting transmission path.

A combination of one or more of the above techniques may be used. Moreover, any other suitable method for encoding the surrogates may be used as necessary and/or desired.

In one embodiment, a full spectrum representation of a surrogate may be encoded rather than a maximally efficient sparse spectrum representation. In another embodiment, a surrogate may be encoded using more frequency elements than a maximally efficient sparse spectrum representation and fewer spectrum elements than a full spectrum representation depending on the degree of immunity that is needed or desired. The use of a less efficient, but more robust sparse spectrum representation may be useful if the nominal noise-free region is not entirely noise-free.

Spread-of-masking is significantly greater for people with hearing loss than for people with normal hearing. For this population, the range of spread-of-masking in the vicinity of an intense signal is greater and more signal elements of a surrogate can be encoded within the larger spread-of-masking range. In one embodiment designed for people with hearing loss, additional signal elements can be encoded that may improve the intelligibility and/or quality of the surrogate. In one embodiment, the intensity of weak consonants relative to that of neighboring vowels may be increased to improve intelligibility and/or sound quality.

In one embodiment, the encoding of the surrogates may be such that a listener using a device that is not enabled to decode surrogates will not perceive a change in the intelligibility and/or sound quality of the signal.

Referring again to FIG. 3, in step 330, an optional check may be made to determine if the receiving device is capable of receiving a spectrum representation or other coding of the signal instead of a time domain signal. In one embodiment, if a spectrum representation can be transmitted instead of a time domain signal, in step 340, a spectrum representation of the signal may be transmitted. The sparse spectrum representation may require fewer bits in digital conversion, processing and/or transmission than would the continuous time function representation of the signal. This is particularly advantageous in transmission of the signal via communication paths with limited or low channel capacity. Transmission of fewer bits without loss of speech intelligibility and/or sound quality may also provide additional improvements associated with performance metrics of communication networks. Examples of improved performance metrics that may be realized include, but are not limited to, network utilization, network throughput, and the like.

In one embodiment, the optional check in step 330 may not be performed, and the time domain signal may always be sent to the receiving device.

In step 335, if the receiving device is not capable of receiving a spectrum representation or other coding of the signal, or if it cannot be determined if the receiving device is capable of receiving a spectrum representation or other coding of the signal, or if the optional check is not performed, the inverse transform may be applied to regenerate the time signal, and the time-domain signal may be transmitted to the receiving device. Examples of inverse transformations include, but are not limited to, inverse Fourier transforms, inverse Discrete Fourier transforms, inverse Fast Fourier transforms, inverse Gabor transforms, inverse Gabor-Wigner transforms, and the like.

In one embodiment, an inverse frequency-to-time transform may be applied to a full spectrum representation of the signal in the frequency domain. The regenerated time signal embedded with encoded surrogates is then transmitted. In another implementation, a sparse spectrum representation of the frequency domain signal may be derived, transformed to a time-domain signal and transmitted. This sparse spectrum representation, however, will include frequency elements encoded with surrogates and is not the most sparse spectrum representation that can be transmitted. A sparse spectrum with the minimum number of frequency elements in order to be perceptually indistinguishable from the unprocessed signal may not contain frequency elements with encoded surrogates. Since additional frequency elements are required to encode surrogates, a sparse spectrum with embedded surrogates may be less sparse than one without surrogates. In another embodiment designed to minimize the channel capacity required for the transmitted signal, a minimally sparse spectrum may be used to embed minimally sparse surrogates. The use of minimally sparse surrogates has the added advantage that surrogates from several neighboring time windows may be embedded in a window to provide immunity against noise bursts or drop outs in which a sequence of windows is lost.

The regenerated time domain signal with the encoded surrogates is then transmitted in step 335. If the receiving device is capable of receiving a spectrum representation or other coding of the signal instead of a time domain signal, the spectrum representation or other coding may be transmitted to the receiving device, in step 340, as discussed with regard to step 330.

Figure 4A:
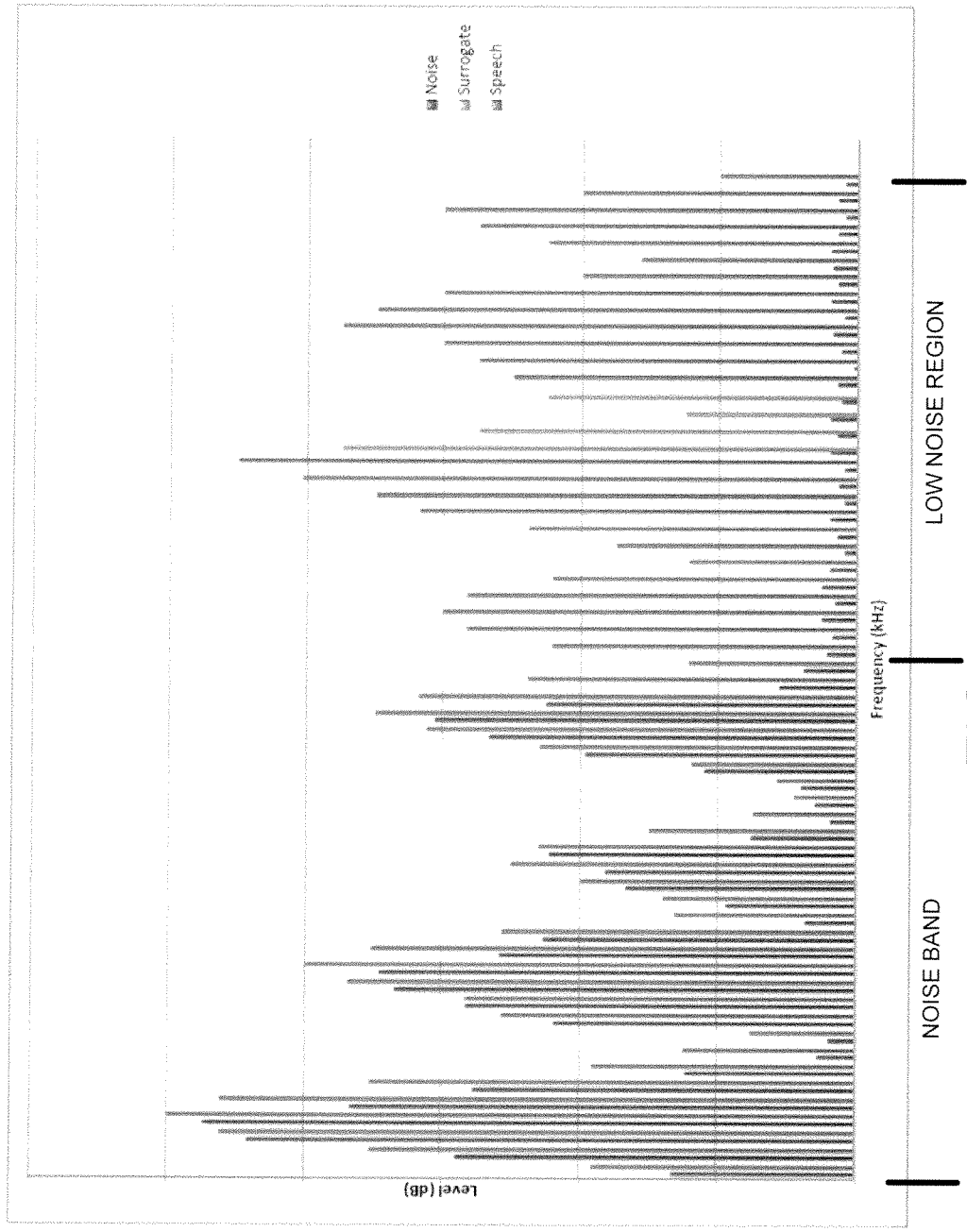

FIGS. 4A-4D illustrate an example of a method of encoding surrogates according to one embodiment. FIG. 4A illustrates the spectrum representation of the received signal with no encoding of surrogates. The time signal was digitized at a sampling rate of 12 kHz. A discrete Fourier transform was applied to time windows of 200 samples (16.7 msec duration). The resulting discrete frequency spectrum consists of 60 frequency elements (line spectra) spaced 100 Hz apart for each window. The blue frequency elements represent the speech, the red frequency elements represent the noise acquired at the source or in transmission. The bandwidth of the signal is 6 kHz. There is substantial noise in the frequency region below 3 kHz and this frequency region is identified as the noise band. The frequency region between 3 kHz and 6 kHz is a low noise or "noise free" region.

Figure 4B:
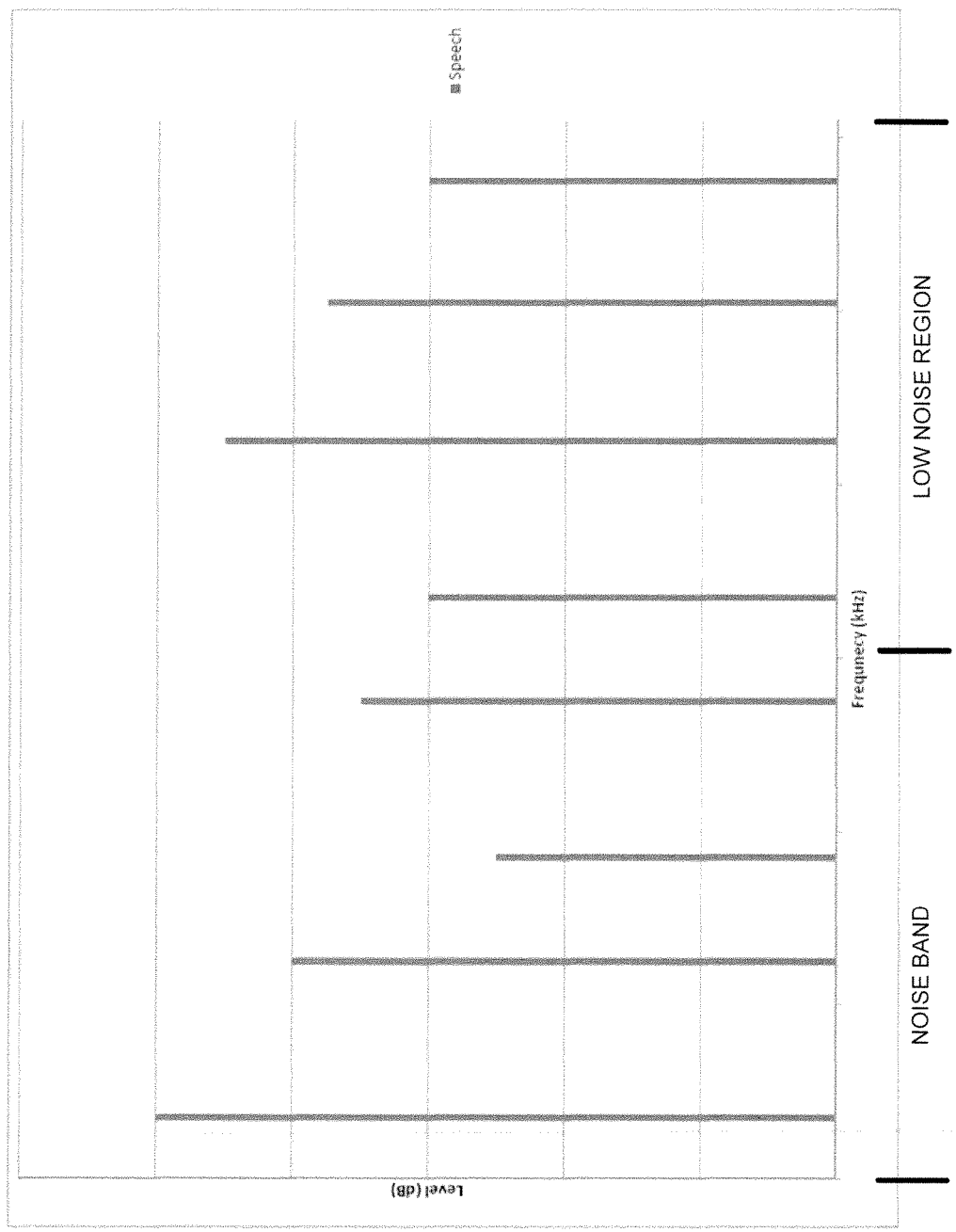

FIG. 4B illustrates a sparse spectrum representation of the transmitted signal prior to the acquisition of noise. In this example, the sparse spectrum representation consists of 10 frequency elements, one for each major peak in the spectrum. One important property of a sparse spectrum representation is that each spectral peak contains substantial speech information and if sufficient peaks are included in the sparse spectrum representation, the resulting time signal obtained from the inverse frequency-to-time transform will be perceptually indistinguishable from the original, unprocessed time signal. An effective way of reducing the effects of noise in a communication channel is to derive surrogates of spectral peaks in the noise band(s)/risk region(s) and encode these surrogates in the noise-free region(s). An enabled receiving device may decode the surrogates in the received signal and replace the noisy frequency elements of the received signal with the noise-free surrogates after conversion to their original frequencies.

FIG. 4C illustrates an embodiment in which surrogates of major peaks in the noise band(s)/risk region(s) may be encoded in the noise-free region(s) of the signal. The arrow identifies the largest peak in the noise free region. This intense peak produces substantial upward spread of masking. The dashed line shows the threshold of audibility for frequency elements at frequencies above that of the intense peak. Frequency elements below the dashed line are not audible to the human ear, but can be decoded by an enabled device.

In one embodiment, the four major peaks in the noise band may be encoded as four surrogate frequency elements in the region below the dashed line. The four surrogates are represented by four green frequency elements in FIG. 4C. The intensities of these four surrogates are the same, respectively, as the intensities of the four spectral peaks in the noise band less 25 dB. A fixed attenuation of 25 dB is used in order to ensure that none of the surrogates exceeds the threshold of audibility represented by the dashed line. The phase component of the surrogate frequency element is used to encode the original frequency of the surrogate.

FIG. 4A shows the spectrum representation of the received signal if there is no encoding of surrogates, while FIG. 4C shows the spectrum representation of the received signal with encoded surrogates. The two spectrum representations are almost identical except for differences in the level and phase of the frequency elements below the dashed line in FIG. 4C. Frequency elements below the dashed line may not be audible and the two spectrum representations when converted back to time signals may be perceptually indistinguishable.

FIG. 4D shows a spectrum representation of the received signal after it has been decoded by an enabled device. In this embodiment, all of the noisy frequency elements in the noise band have been eliminated and the four decoded surrogates have been regenerated at their original frequencies and amplitudes. The received signal spectrum has a sparse spectrum in the noise band and a full spectrum in the low-noise region. Other methods of decoding may combine amplified decoded surrogates with attenuated noisy frequency elements.

Another embodiment may use less sparse encoding of surrogates in order to improve sound quality for music and other audio signals requiring high fidelity reproduction. Since in this example there is some low level noise that is barely audible in the low noise region, the decoded signal will also have some low level noise that is barely audible, as shown by the red frequency elements in the figure.

Figure 5:
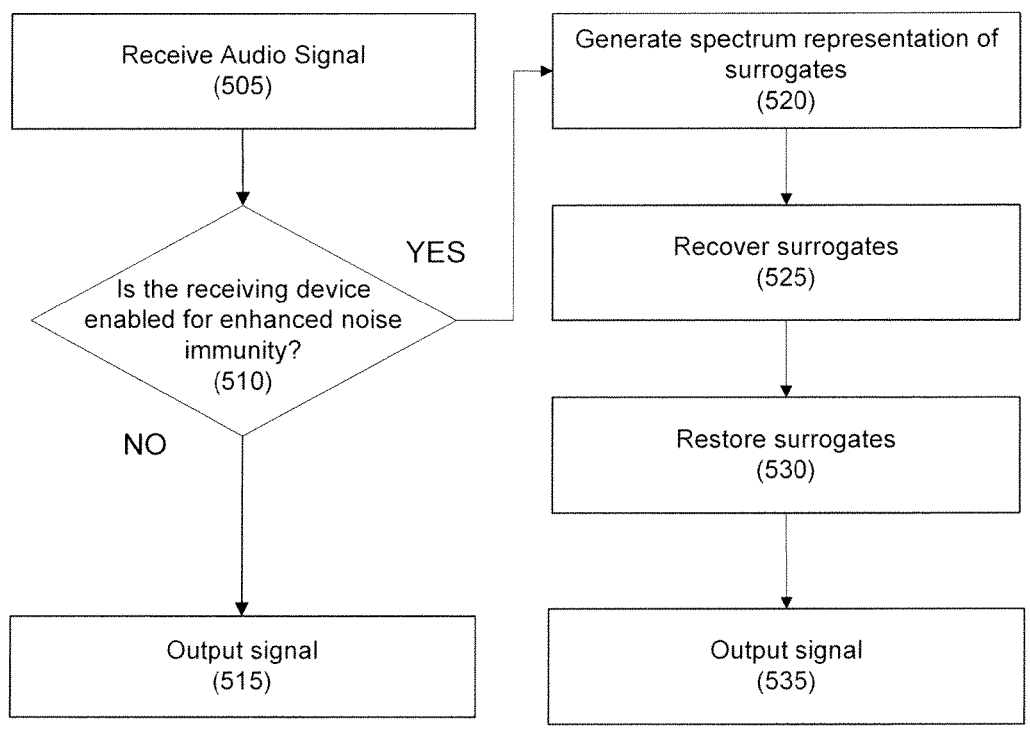
FIG. 5 depicts an exemplary method for decoding a received signal with embedded surrogates.

FIG. 5 depicts a method for decoding a received signal with embedded surrogates. In step 505, a time domain signal may be received by the receiving device, and, in step 510, if the receiving device is a non-enabled receiving device, the signal is output for the listener in step 515 without processing or decoding of the surrogates.

In step 520, if the receiving device is an enabled device, the spectrum representation may be generated from the received time signal using the transform employed in step 315 of FIG. 3. In one embodiment, it may not be necessary to regenerate the spectrum representation if it is received directly from the transmitting device.

In step 525, the surrogates may be recovered by first identifying which frequency elements are surrogates, or have surrogates encoded in them. In one embodiment, a frequency element serving as a surrogate, or having a surrogate encoded in it, may have the original frequency of the surrogate encoded in the phase value. A frequency element which is not a surrogate or does not have a surrogate encoded in it will have a phase value within the range 0 to 360 degrees. A frequency element with a phase value greater than 360 degrees may be identified as a surrogate, or have a surrogate encoded in it and that the phase value in excess of 360 degrees (expressed in the form of a delay) may be the original frequency of the surrogate. Other forms of encoding surrogates and of identifying surrogates and their original frequencies either in the masking range of an intense frequency element, phase element, frequency offset, etc. may be implemented as necessary or desired.

In step 530, the surrogates may be restored by transforming them back into their original values in frequency and time. In one embodiment, the frequency elements serving as surrogates or encoded with surrogates may be decoded prior to applying the inverse frequency-to-time transform. The frequency elements in the noise band(s)/risk region(s) may be eliminated or reduced and replaced by the surrogates at their original frequencies. The surrogates may also be amplified. In another embodiment, the frequency elements in the noise band(s)/risk region(s) may be reproduced and combined with like frequency elements of the restored surrogates. The combination of noisy received frequency elements in the noise band(s)/risk region(s) with like frequency elements of the restored surrogates may improve the speech-to-noise ratio with concomitant improvements in intelligibility and/or sound quality.

Methods of combining frequency elements in the noise band(s)/risk region(s) with like frequency elements of the restored surrogates may use other forms of processing in addition to, or instead of, amplification in order to improve the speech-to-noise ratio, intelligibility, and/or sound quality. The selected method of signal processing may enable the receiving device to deliver the best quality signal it can to the user of the enabled device.

One embodiment addresses the condition in which both the transmitted frequency elements and their surrogates have reduced speech-to-noise ratios. The method combines the noisy transmitted frequency elements and their noisy surrogates so as to maximize the speech-to-noise ratio. An efficient method of combining two noisy frequency elements is to use a weighted sum of the frequency elements in which the weights assigned to each frequency element is the reciprocal of the standard deviation of the noise in that frequency element.

In step 535, after restoring the surrogates to their original frequencies, the inverse transform corresponding to the transform used in step 520 may be used to regenerate the time signal. The regenerated time signal may have an improved speech-to-noise ratio as a result of the processing described above. The regenerated time signal may be delivered to the user via a loudspeaker, headphones or other means of delivering signals to the user of a receiving device.

In some of the embodiments discussed above, signal processing is generally described as being performed in the frequency domain after a time-to-frequency transform, such as the Fourier transform. In embodiments that do not involve the use of time-to-frequency transforms and the associated frequency-to-time inverse transforms, some or all of the signal processing may be performed in the time domain. An advantage of operating in the time domain is that less intensive signal processing may be needed. In one such embodiment, a bank of contiguous narrowband filters, in which the output of each filter is an approximately sinusoidal signal varying slowly in amplitude and phase at the center frequency of the narrowband filter, may be used. Filters with a high-level signal output will mask signals of neighboring filters with low-level outputs. The masked low-level signals may be replaced with surrogates from noise band(s)/risk region(s) in a manner analogous to that used in frequency-domain processing.

In one embodiment, each narrowband filter may be a time-domain analog of a frequency element in a frequency-domain embodiment. For example, in a frequency-domain implementation, the lowest frequency element, referred to as the "fundamental frequency element," has a frequency equal to 1/duration of the time window of the short-term Fourier transform used in formulating the frequency-domain implementation. The next higher frequency element has a frequency equal to twice that of the fundamental frequency element. The next higher frequency element has a frequency equal to three times that of the fundamental frequency element, and so on. In the time-domain analog, the narrowband filter with the lowest frequency has a center frequency equal to that of the fundamental frequency element in the frequency-domain implementation. The next higher narrowband filter has a center frequency equal to twice that of the fundamental frequency element, the next higher narrowband filter has a center frequency equal to the three times that of the fundamental frequency element, and so on.

Another advantage of a time-domain implementation is that the problem of between-window discontinuities in a frequency-domain implementation may be avoided. In a frequency-domain implementation, the time signal is subdivided into a sequence of time windows enabling short-term spectral analyses and related frequency-domain processing to be performed within each time window. A computationally intensive time-to-frequency transform, such as the Fourier transform, may be needed followed by an associated computationally intensive frequency-to-time transform, such as the inverse Fourier transform, in order to return to the time domain so that the user of the device can listen to the processed signals. On transforming back to the time domain, however, discontinuities may occur at the boundaries between successive time windows. Thus, smoothing operations such as the overlap-add method may be used to eliminate discontinuities at the boundary between successive time windows. Examples of smoothing properties are disclosed in Smith, S. W., "Scientists and Engineers Guide to Digital Signal Processing," 1997, California Technical Publishing, the disclosure of which is incorporated, by reference, in its entirety.

In time-domain processing, that the narrowband filters that are used to separate high-level frequency components (or high-level time-frequency components utilizing temporal masking) from low-level inaudible signal components may introduce a perceptible ripple in the frequency response of the filter bank. It is not possible in a practical narrowband filter to have an infinite rate of attenuation at either end of the pass band. The finite rate of attenuation beyond the pass band is referred to as "roll off." Thus, adjacent narrowband filters will overlap as a result of the finite roll off of each filter.

In one embodiment which is a close analogy to frequency-domain processing, the impulse response of each narrowband filter is equal to the time expansion of the corresponding frequency element in the frequency-domain implementation. In another embodiment, the impulse response is modulated by a weighting function to reduce the roll off of the narrowband filter outside of the pass band. A discussion of weighting functions, such as a raised cosine function and others, is provided in Blackman R. B. and Tukey J. W., The Measurement of Power Spectra, 1958, Dover Publications, Inc., the disclosure of which is incorporated, by reference, in its entirety.

In one embodiment, the ripple in a bank of contiguous narrowband filters may be eliminated by specifying the amplitude and phase response of each narrowband filter such that when the outputs of two or more contiguous narrowband filters are added together, the signals in the overlapping filters add in phase with appropriate amplitudes so as to produce a combined frequency response with no ripple. There is, however, a fundamental constraint that needs to be taken into account in the design of these filters. For example, in one embodiment, each narrowband filter in a filter bank has an ideal frequency response such that the combined frequency response of two or more contiguous narrowband filters has no ripple. The inverse Fourier transform of the ideal frequency response of a filter is the ideal impulse response of the filter. If, however, the filter has a finite bandwidth, the corresponding impulse response will be of infinite duration which is not ideal for a practical device. Similarly, if the impulse response of a filter is of finite duration, the frequency response of the filter will be infinite. This fundamental constraint, however, does not preclude a filter bank in which each narrowband filter has an impulse response with a finite duration comparable to the averaging time of the human ear and a frequency response that is infinite, but with deviations from the ideal frequency response that may not be perceptible.

The duration of the impulse response of each narrowband filter may be truncated such that its duration is comparable to the averaging time of the human ear. In another implementation designed for people with hearing loss, the duration of the impulse response of each narrowband filter may be truncated such that its duration is comparable to the averaging time of the impaired human ear.

Figure 6A:
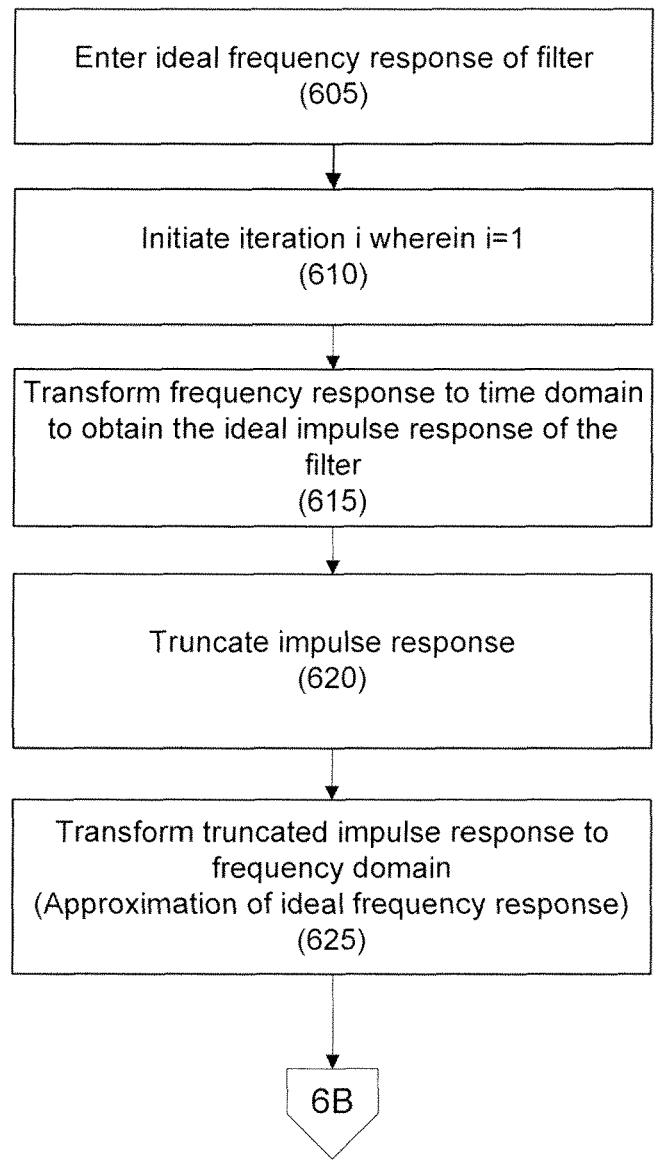
FIGS. 6A and 6B depict an exemplary method for the realization of narrowband filters according to one embodiment.
Figure 6B:
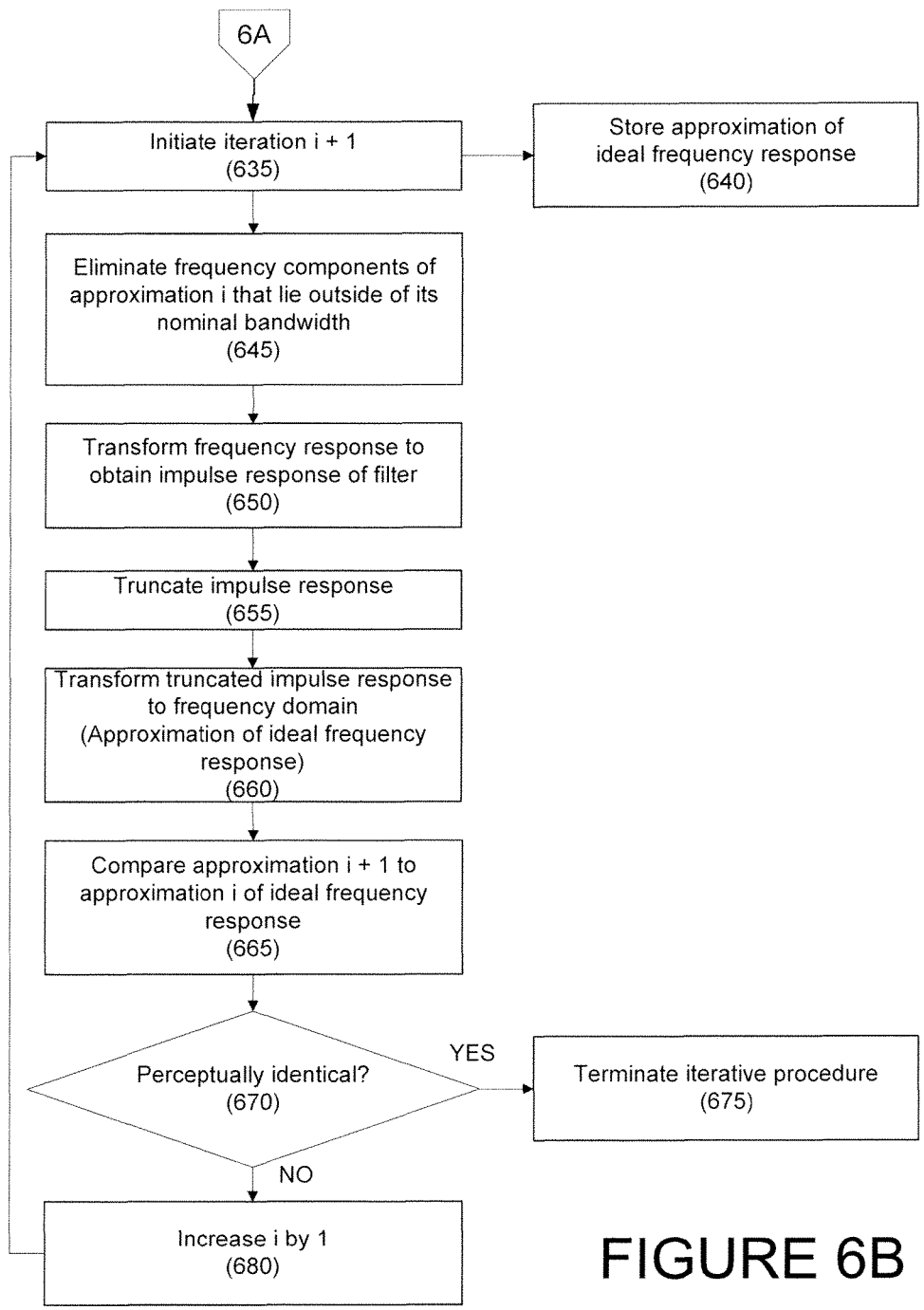

In order to have filters that can efficiently encode surrogates, filters having a short impulse response to track short-term changes in the structure of the speech signal while, at the same time, having bandwidths that are small enough to encode the surrogates of narrow frequency elements efficiently may be used. FIGS. 6A and 6B show an illustrative embodiment of a method for the realization of narrowband filters suitable for encoding surrogates that approach the limits of this fundamental constraint. The implementation of the method also takes into account the limitations of the human ear.

Referring to FIG. 6A, in step 605, the ideal frequency response of a narrowband filter may be specified. This filter response has a finite bandwidth. In this embodiment, each narrowband filter has a bandwidth that is less than the critical band of hearing, and the width of the critical band of hearing may increase with frequency. Methods of measuring the critical band are disclosed, for example, in B. C. J. Moore, An introduction to the Psychology of Hearing, Sixth Edition, 2013, Academic Press, the disclosure of which is incorporated, by reference, in its entirety. In one embodiment, a nominal bandwidth of ⅕ octave may be used. In another embodiment, a bank of filters with bandwidths that do not vary with frequency may be used, such as a fixed bandwidth of, for example, 50 Hz at all frequencies. The frequency response of the narrowband filter may have an amplitude of 1 in the pass band. In the overlap region with the adjacent lower-frequency filter, the frequency response may increase from 0 to 1 in proportion to $sine^2$. In the overlap region with the adjacent higher-frequency filter, the frequency response may decrease from 1 to 0 in proportion to $cosine^2$. The adjacent filters may also be in phase in the overlap region so that the signals in the two filters add arithmetically to 1 at all frequencies in the overlap region. Because $sine^2 + cosine^2 = 1$, the combined frequency response of the contiguous ideal narrowband filters is 1 at all frequencies thereby avoiding the creation of ripple in the combined frequency response.

In step 610, an iterative procedure may be initiated with i=1. In step 615, an inverse Fourier transform may be applied to the ideal frequency response to obtain the ideal impulse response of the filter. The ideal impulse response is of infinite duration since the filter bandwidth is finite. The impulse response may be truncated in step 620 to a duration compatible with the averaging time of the ear. For example, the impulse response may be limited to a duration on the order of 20 msec.

In step 625, the truncated impulse response may be subjected to a Fourier transform to obtain the filter's frequency response. Because the impulse response has been truncated, it is no longer the ideal impulse response, and the resulting frequency response is no longer ideal. It is, however, an approximation of the ideal frequency response.

Continuing to FIG. 6B, in step 635, iteration i+1. may be initiated. In step 640, the frequency response obtained in step 625 of FIG. 6A is stored in memory as approximation i. At this stage, i=1. Approximation i has an infinite frequency response since it is the Fourier transform of an impulse response of finite duration (step 625 of FIG. 6A). The components of the frequency response outside the nominal bandwidth of the filter are small but not negligible.

In step 645, the frequency components of approximation i that lie outside of its nominal bandwidth may be eliminated. This frequency response is now an estimate of the ideal frequency response with a finite bandwidth.

In step 650, the frequency response in step 645 may be subjected to an inverse Fourier transform in order to obtain its impulse response. Because the frequency response in step 645 has been truncated to its nominal finite bandwidth, the resulting impulse response will be of infinite duration.

In step 655, the infinite impulse response may be truncated again. At this stage of the iterative process, the amount of energy in the impulse response at durations in excess of 20 msec is less than that when the impulse response was truncated previously in step 620 of FIG. 6A.

The truncated impulse response may be subjected to a Fourier transform in step 660 to obtain the frequency response. As before, the frequency response of the truncated impulse response will have frequency components stretching to infinity, but the components of the frequency response outside of the filter's nominal bandwidth will be smaller than in the previous iteration. This frequency response is an improved approximation to the ideal frequency response for an impulse response of finite duration. It may be identified as approximation i+1, and, in step 665, may be compared to approximation i stored in memory. If, in step 670, approximation i+1 differs significantly from approximation i that is stored in memory, in step 680, index i is increased by 1, and the iteration may be repeated. For example, a significant difference may be one in which approximation i is perceptually distinct from approximation i+1. With each iteration, approximation i+1 approaches the ideal frequency response more closely.

When an iteration is reached such that approximation i+1 is not perceptibly different from iteration i, subsequent iterations may not yield further improvements of importance for the intended application and, in step 675, the iterative procedure may be terminated.

The filter designed by the iterative method described above may minimize the amount of energy outside of the nominal filter bandwidth for a filter with a finite impulse response. In this illustrative example, an impulse response with a duration comparable to the averaging time of the ear was be used. A filter with a finite impulse response much larger than the averaging time of the ear may reduce the frequency components outside of the nominal bandwidth even further, but at the cost of introducing other, perceptually more salient distortions, such as apparent reverberation of the processed signals, or ringing of the filters. An impulse response much shorter than the averaging time of the ear may converge on a poorer approximation to the ideal frequency response with larger frequency components outside of the nominal bandwidth of the narrowband filter.

In another embodiment, narrowband filters may be designed using a perceptual test that evaluates the reduction in perceptible ripple in the frequency response of the filter bank. In this embodiment, the iterative procedure may converge on a realizable filter that may minimize deviations from the ideal frequency response in the overlap region between adjacent filters. The perceptual comparison in these iterations (step 670) may compare reductions in the perception of ripple with each iteration. This method addresses the problem of perceptible ripple directly, but it may not minimize the frequency components outside of the nominal filter bandwidth for a filter with a finite impulse response.

In another embodiment, the iterative procedure may be used to converge first on a condition that minimizes frequency components outside of the nominal filter bandwidth for a filter with a finite impulse response, followed by an iterative process for minimizing the perception of ripple in a bank of contiguous narrowband filters. This two-stage iterative procedure may provide the closest practical approximation to the theoretical limit for maximizing both frequency and temporal resolution in a filter for human hearing followed by an iterative procedure which minimizes the perception of ripple by transferring the minimal deviations from the ideal frequency response away from the sensitive overlap region of adjacent filters.

In another embodiment, the iterative procedure may terminated using an objective rather than a perceptual criterion in step 670. For example, the iterative procedure may be terminated when the sum of the frequency components outside of the nominal filer bandwidth on iteration i+1 is reduced by less than a predetermined percentage of that obtained on iteration i. For example, the predetermined percentage may be small. The predetermined percentage may vary as necessary and/or desired.

Figure 7:
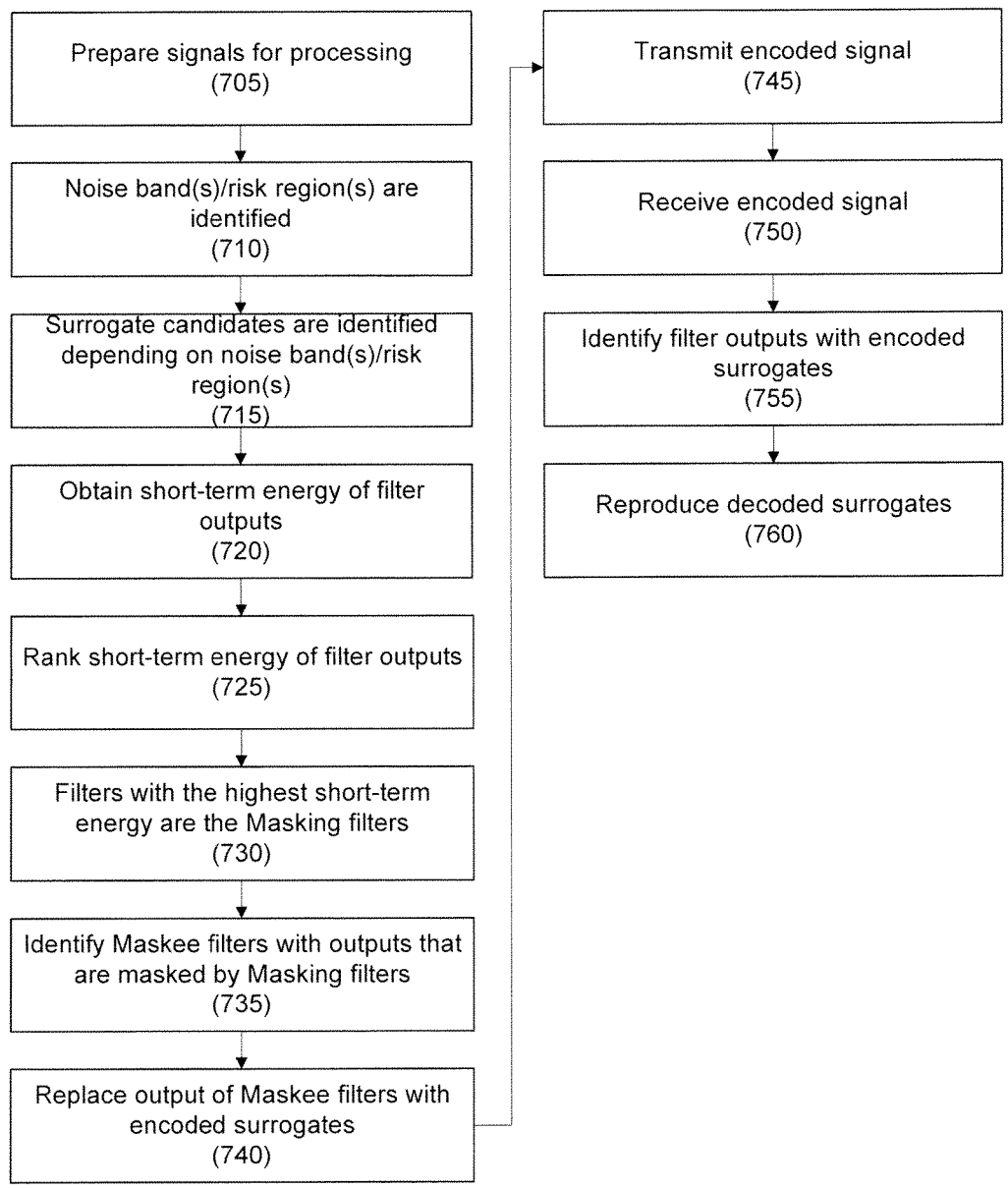
FIG. 7 depicts an exemplary method for improving noise/distortion immunity according to one embodiment using a bank of contiguous narrowband filters.

FIG. 7 depicts a method for improving noise/distortion immunity according to one embodiment in which signal processing is performed in the time domain. A set of narrowband filters may be used with bandwidths that are less than the critical band of hearing. For example, narrowband filters with bandwidths of 50 Hz may be used. Thus, for a system with an overall bandwidth of 10,000 Hz, the filter bank will consist of 200 filters.

In step 705, an audio signal is prepared for transmission. This may include amplification and pre-whitening to make efficient use of the dynamic range of the signal processor. Analog or digital signal processing may be used. If digital signal processing is used, a sampling rate greater than twice the highest frequency in the audio signal is used in order to avoid aliasing errors.

In one embodiment, the audio signal may be received at a transmitting and receiving device, for example, a cellular phone, tablet computer, smart phone, two-way radio, or any suitable device. In one embodiment, the audio signal may be received directly (e.g., spoken by a human) or indirectly (received via a hardwired or wireless magnetic or electromagnetic connection), etc.

In step 710, the noise band(s)/risk region(s) are identified. This may be similar to step 310, discussed above.

The surrogate candidates are then determined in step 715. In one embodiment, if the noise band(s)/risk region(s) are known, surrogates candidates may be the output of those narrowband filters in the region of the noise band(s)/risk region(s). In another embodiment, if the noise band(s)/risk region(s) are unknown, the output of every narrowband filter is a surrogate candidate. In another embodiment in which the noise band(s)/risk region(s) are unknown, it may be sufficient to encode surrogates of the Maskee filter outputs in order to obtain immunity from noise and/or distortion.

As discussed above, the reason for encoding surrogates of only the most intense filter outputs is based on experimental evidence showing that a sparse spectrum representation using more than 16 of the most intense frequency elements is almost indistinguishable perceptually from a full spectrum representation of speech. In one embodiment, it may thus be sufficient to encode surrogates of, for example, the 20 Maskee filter outputs rather than encoding surrogates of all the filter outputs in order to obtain immunity from noise and/or distortion when the noise band(s)/risk regions(s) are not known. The number of frequency elements and/or Maskee filter outputs may be selected as necessary and/or desired.

In step 720, the short-term output level of each filter may be obtained. The short-term output level is a running average of the energy at the output of each filter converted to dB SPL. An averaging time comparable to that of the human ear may be used in determining the short-term energy at the output of each narrowband filter.

In step 725, the output levels of the narrowband filters may be ranked in terms of their relative levels. In step 730, the filters with the highest output levels are identified as "Masking filters." In one embodiment, the 20 filters with the highest output levels may be identified; other numbers of filters may be identified as necessary and/or desired.

Because the rankings may change over time, the rankings may be updated, for example, at regular intervals. In one embodiment the rankings may be updated two or more times within the averaging time used in obtaining the output levels. This is done to obtain a smooth transition when there is a change with respect to which filters are identified as Maskee filters. The filters with the highest output levels (e.g., the 20 filters) may also be used to represent the speech signal in the same way that a sparse spectrum representation may be used to represent speech efficiently.

In step 735, the filters with low output levels that are masked by the more powerful Masker filters are identified as Maskee filters. The outputs of the Maskee filers are inaudible and may be replaced by encoded surrogates in step 740. The encoded surrogates are also inaudible. The method of encoding the format of the encoded surrogates differs from that of the unprocessed filter outputs so that an enabled receiver can identify which filter outputs have been replaced by encoded surrogates.

The audio signal with the encoded surrogates may be delivered to a transmitting device in step 745 and is received by an enabled receiving device in step 750.

In one embodiment, the received signal may be analyzed in step 755 to determine which filter outputs contain encoded surrogates. If the receiver is not enabled, the transmitted filter outputs are delivered to the user without further processing. In one embodiment, the encoding of the received signal may be such that a listener using a device that is not enabled to decode surrogates will not perceive a change in the intelligibility and/or sound quality of the signal.

In step 760, the surrogates may be decoded and transformed back into their original values in frequency and time. The filter outputs in the received signal which are in the noise band(s)/risk region(s) may be eliminated or reduced and replaced by the surrogates at their original frequencies.

In one embodiment, the surrogates may also be amplified. In another embodiment, the filter outputs in the noise band(s)/risk region(s) may be reproduced and combined with the restored surrogates. The combination of noisy filter outputs in the noise band(s)/risk region(s) with like frequency elements of the restored surrogates may improve the speech-to-noise ratio with concomitant improvements in intelligibility and/or sound quality.

Methods of combining filter outputs in the noise band(s)/risk region(s) with like frequency elements of the restored surrogates may use other forms of processing in addition to, or instead of, amplification in order to improve the speech-to-noise ratio, intelligibility, and/or sound quality. The selected method of signal processing may enable the receiving device to deliver the best quality signal it can to the user of the enabled device.

One embodiment addresses the condition in which both the transmitted filter outputs and their surrogates have reduced speech-to-noise ratios. The method combines the noisy transmitted filter outputs and their noisy surrogates so as to maximize the speech-to-noise ratio. An efficient method of combining two noisy frequency elements is to use a weighted sum of the frequency elements in which the weights assigned to each frequency element is the reciprocal of the standard deviation of the noise in that frequency element.

The preceding illustrative example described embodiments for improved immunity to noise and/or distortion of audio signals. Audio signals were selected for the illustrative example because of the greater complexity of analyzing and processing audio signals of finite duration using transforms that involve integration over infinite time. The methods used to improve immunity to noise and/or distortion of audio signals can be applied to video signals with less difficulty. In one embodiment analogous to that used for noise immunity in audio signal transmission, each video image is divided into two regions: i) A noise/risk region where noise or distortion will occur, or is likely to occur, as a result of transmission or storage in an imperfect communication network, and 2) a noise-free region in which noise and/or distortion is highly unlikely. Important information-bearing pixels, such as pixels identifying a boundary between two objects in an image, or a rapid change in brightness or color to which the eye is especially sensitive, are identified and surrogates of these pixels are encoded and stored in a noise-free region. The noise-free region may be in the same image frame or a neighboring image frame. In one embodiment, the surrogates may be stored so as to be masked to the human eye by a more intense pixel within masking range. In another embodiment, the surrogates may be stored in the lowest bits of a digitized image.

Video displays have a finite dynamic range and in one embodiment the surrogates may be encoded to exceed the dynamic range of the display; i.e., the surrogate may appear to be the same as a white or black pixel at either end of the display's dynamic range, but an electronic decoder can extract the information delivered to the pixel that is beyond the dynamic range of the video display. Other methods of steganography using analog or digital signals may be used to store and retrieve surrogates as needed or desired.

Various technologies may be used to provide communication between the various components (e.g., processors, memories, etc.) as well as to allow the components to communicate with any other component as necessary and/or desired (e.g., so that the component may obtain further instructions, may access and use remote memory stores, etc.) Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example. Accordingly, a variety of different configurations are contemplated.

Hereinafter, general aspects of implementation of the systems, devices, and methods of the invention will be described.

The system of the invention or portions of the system of the invention may be in the form of a "processing component," such as a general purpose computer, for example. As used herein, the term "processing component" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit), a Reduced Instruction Set Computer (RISC) or other integrated circuit, a logic circuit, a digital signal processor, a programmable logic device such as a FPGA, PLD, PLA or PAL, or any other device or arrangement of devices that is capable of implementing the steps of the processes of the invention. Any or all of these processing machines may be implemented in a variety of devices, such mobile phones/devices, landline telephones, hearing aids, personal amplification devices, assistive listening devices, video and audio conferencing systems, voice over IP devices, streaming radio devices, two-way radios, tablet computers, desktop and notebook computers, workstations, electronic reading devices, etc.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same physical or geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its embodiments, it is to be understood that this invention is only illustrative and exemplary of the present invention and is made to provide an enabling invention of the invention. Accordingly, the foregoing invention is not intended to be construed or to limit the present invention or otherwise to exclude any other such embodiments, adaptations, variations, modifications or equivalent arrangements.

What is claimed is:

1. A method for improving noise immunity in a communication, comprising:
    at least one computer processor determining a region of interest in a received audio signal;
    the at least one computer processor determining a surrogate candidate within the region of interest of the received signal; and
    the at least one computer processor encoding the surrogate candidate as a surrogate in a different frequency, time, or phase region of the received audio signal other than the region of interest;

wherein the surrogate comprises a spectral component of the received audio signal;

wherein the step of encoding the surrogate candidate as a surrogate does not increase bandwidth of the received audio signal.

2. The method of claim 1, wherein the signal further comprises a video signal.

3. The method of claim 1, wherein the region of interest comprises a noise band within the received audio signal.

4. The method of claim 1, wherein the surrogate candidate comprises an element of the signal that has an intensity below an intensity within the region of interest.

5. The method of claim 1, wherein the spectral component is generated using a transform selected from the group consisting of a Fourier transform, a Fast Fourier transform, a Discrete Fourier transform, a Gabor transform, and a Gabor-Wigner transform.

6. The method of claim 1, wherein the step of encoding the surrogate candidate as a surrogate in a different frequency, time, or phase region of the signal other than the region of interest comprises:

the at least one computer processor encoding the surrogate candidate in a phase element of the signal.

7. The method of claim 1, wherein the step of encoding the surrogate candidate as a surrogate in a different frequency, time, or phase region of the signal other than the region of interest comprises:

the at least one computer processor encoding the surrogate candidate within a spread-of-masking range of an intense frequency element.

8. The method of claim 1, wherein the step of encoding the surrogate candidate as a surrogate in a different frequency, time, or phase region of the signal other than the region of interest comprises:

the at least one computer processor encoding the surrogate candidate within a predetermined range of an intense frequency element.

9. The method of claim 1, further comprising:

the at least one computer processor transmitting the signal comprising the surrogate to a second device.

10. The method of claim 1, further comprising:

the at least one computer processor generating a regenerated signal from the signal comprising the surrogate; and transmitting the regenerated signal to a second device.

11. The method of claim 1, wherein the spectral component comprises a single spectral component.

12. A method for improving noise immunity in a communication, comprising:

at least one computer processor identifying a surrogate candidate encoded as a surrogate in a received audio signal, wherein the surrogate comprises a spectral component of the signal, and wherein the encoded surrogate candidate does not increase bandwidth of the received audio signal;

the at least one computer processor restoring the surrogate candidate in a different frequency, time, or phase of the received audio signal; and the at least one computer processor generating a regenerated signal from the received audio signal with the restored surrogate candidate.

13. The method of claim 12, wherein the spectral component is generated using a transform selected from the group consisting of a Fourier transform, a Fast Fourier transform, a Discrete Fourier transform, a Gabor transform, and a Gabor-Wigner transform;

wherein the surrogate is identified in the spectrum representation.

14. The method of claim 12, wherein the surrogate is within a spread-of-masking range of an intense frequency element.

15. The method of claim 12, wherein the surrogate is within a predetermined range of an intense frequency element.

16. The method of claim 12, further comprising:

the at least one computer processor amplifying the surrogate.

17. The method of claim 12, further comprising:

the at least one computer processor determining a region of interest in the received audio signal; and the at least one computer processor attenuating the intensity of at least one signal element within the region of interest.

18. The method of claim 12, wherein the spectral component comprises a single spectral component.

19. A communication device, comprising:

a memory;

at least one computer processor that performs the following:

determine a region of interest in an audio signal;

determine a surrogate candidate within the region of interest of the audio signal; and encode the surrogate candidate as a surrogate in a different frequency, time, or phase region of the signal other than the region of interest wherein the surrogate comprises a spectral component of the received audio signal; and an interface for communicating with a second communication device;

wherein encoding the surrogate candidate as a surrogate does not increase bandwidth of the received audio signal.

20. The communication device of claim 19, wherein the at least one computer processor further performs the following:

identify a surrogate candidate encoded as a surrogate in a received signal;

restore the surrogate candidate in the signal;

generate a regenerated signal from the signal with the restored surrogate candidate; and output the regenerated signal.

21. The communication device of claim 19, wherein the spectral component is generated using a transform selected from the group consisting of a Fourier transform, a Fast Fourier transform, a Discrete Fourier transform, a Gabor transform, and a Gabor-Wigner transform.

22. The communication device of claim 21, wherein the at least one computer processor further performs the following:

generate a regenerated signal from the signal comprising the surrogate; and transmit the regenerated signal to the second communication device.

23. The communication device of claim 21, wherein the at least one computer processor further performs the following:

amplify the surrogate.

24. The communication device of claim 19, wherein the signal further comprises a video signal.

25. The communication device of claim 19, wherein the region of interest comprises a noise band within the signal.

26. The communication device of claim 19, wherein the surrogate candidate comprises an element of the signal that has an intensity below an intensity within the region of interest.

27. The communication device of claim 19, wherein the surrogate candidate is encoded in a phase element of the signal.

28. The communication device of claim 19, wherein the surrogate candidate is encoded within a spread-of-masking range of an intense frequency element.

29. The communication device of claim 19, wherein the surrogate candidate is encoded within a predetermined range of an intense frequency element.

30. The communication device of claim 19, wherein the signal is received from an input device comprising at least one of a microphone and a camera.

31. The communication device of claim 19, wherein the signal is received from the memory.

32. The communication device of claim 19, wherein the signal is received from a communication network.

33. The communication device of claim 20, further comprising:
an output device for outputting the regenerated signal comprising at least one of a speaker and a display for outputting the regenerated signal.

34. The communication device of claim 19, wherein the spectral component comprises a single spectral component.

35. A communication device, comprising: a memory; and
at least one computer processor that performs the following:
identify a surrogate candidate encoded as a surrogate in a received audio signal, wherein the surrogate comprises a spectral component of the received audio signal and wherein the encoded surrogate candidate does not increase bandwidth of the audio signal;
restore the surrogate candidate in a different frequency, time, or phase of the received audio signal; and
generate a regenerated signal from the received audio signal with the restored surrogate candidate.

36. The communication device of claim 35, wherein the received audio signal is received from a second communication device.

37. The communication device of claim 35, wherein the received audio signal is received from a communication network.

38. The communication device of claim 35, further comprising:
an output device comprising at least one of a speaker and a display for outputting the regenerated signal.

39. The communication device of claim 35, wherein the spectral component comprises a single spectral component.

* * * * *